United States Patent [19]

Le-Khac

[11] Patent Number: 5,693,584
[45] Date of Patent: Dec. 2, 1997

[54] HIGHLY ACTIVE DOUBLE METAL CYANIDE CATALYSTS

[75] Inventor: Bi Le-Khac, West Chester, Pa.

[73] Assignee: ARCO Chemical Technology, L.P., Greenville, Del.

[21] Appl. No.: 694,896

[22] Filed: Aug. 9, 1996

[51] Int. Cl.⁶ .............. B01J 27/24; B01J 27/26; B01J 31/06; B01J 31/18

[52] U.S. Cl. .............. 502/159; 502/162; 502/175; 502/200

[58] Field of Search .............. 502/175, 200, 502/159, 162

[56] References Cited

U.S. PATENT DOCUMENTS

| | | |
|---|---|---|
| 3,278,457 | 10/1966 | Milgrom . |
| 3,278,458 | 10/1966 | Belner . |
| 3,404,109 | 10/1968 | Milgrom . |
| 3,427,256 | 2/1969 | Milgrom . |
| 3,538,043 | 11/1970 | Herold . |
| 3,829,505 | 8/1974 | Herold . |
| 3,900,518 | 8/1975 | Milgrom . |
| 3,941,849 | 3/1976 | Herold . |
| 4,472,560 | 9/1984 | Kuyper et al. ............ 526/120 |
| 5,145,883 | 9/1992 | Saito et al. ............ 521/172 |
| 5,158,922 | 10/1992 | Hinney et al. ............ 502/175 |
| 5,223,583 | 6/1993 | Higuchi et al. ............ 525/404 |
| 5,470,813 | 11/1995 | Le-Khac ............ 502/175 |
| 5,482,908 | 1/1996 | Le-Khac ............ 502/156 |

FOREIGN PATENT DOCUMENTS

H6184297  7/1994  Japan .

OTHER PUBLICATIONS

J.L. Schuchardt & S.D. Harper, Proceedings of The SPI, 32nd Annual Polyurethane Tech./Market Conf. Oct. 1989, p. 360 no month available.

*Primary Examiner*—Elizabeth D. Wood
*Attorney, Agent, or Firm*—Jonathan L. Schuchardt

[57] ABSTRACT

Improved double metal cyanide (DMC) catalysts are disclosed. The catalysts comprise a DMC compound, an organic complexing agent, from about 0.1 to about 10 wt. % of an organophosphine oxide, and optionally, a polyether. Compared with other DMC catalysts prepared in the absence of the organophosphine oxide, those of the invention have higher activity for epoxide polymerization, and they give polyols having reduced unsaturation even at high epoxide polymerization temperatures.

10 Claims, No Drawings

HIGHLY ACTIVE DOUBLE METAL CYANIDE CATALYSTS

FIELD OF THE INVENTION

The invention relates to double metal cyanide (DMC) catalysts useful for epoxide polymerization. In particular, the invention relates to DMC catalysts that have high activity and that give very low unsaturation polyols even at relatively high epoxide polymerization temperatures.

BACKGROUND OF THE INVENTION

Double metal cyanide complexes are well-known catalysts for epoxide polymerization. These active catalysts give polyether polyols that have low unsaturation compared with similar polyols made using basic (KOH) catalysis. The catalysts can be used to make many polymer products, including polyether, polyester, and polyetherester polyols. The polyols can be used in polyurethane coatings, elastomers, sealants, foams, and adhesives.

DMC catalysts are usually made by reacting aqueous solutions of metal salts and metal cyanide salts to form a precipitate of the DMC compound. A low molecular weight organic complexing agent, typically an ether or an alcohol is included in the catalyst preparation. The organic complexing agent is needed for favorable catalyst activity. Preparation of typical DMC catalysts is described, for example, in U.S. Pat. Nos. 3,427,256, 3,829,505, and 5,158,922.

We recently described substantially amorphous DMC catalysts that have exceptional activity for polymerizing epoxides (see U.S. Pat. No. 5,470,813). We also described highly active DMC catalysts that include, in addition to a low molecular weight organic complexing agent, from about 5 to about 80 wt. % of a polyether such as a polyoxypropylene polyol (see U.S. Pat. No. 5,482,908). Compared with earlier DMC catalysts, the DMC catalysts described in U.S. Pat. Nos. 5,470,813 and 5,482,908 have excellent activity and give polyether polyols with very low unsaturation. The catalysts are active enough to allow their use at very low concentrations, often low enough to overcome any need to remove the catalyst from the polyol. Catalysts with even higher activity are desirable because reduced catalyst levels could be used.

One drawback of DMC catalysts now known is that polyol unsaturations increase with epoxide polymerization temperature. Thus, polyols prepared at higher reaction temperatures (usually to achieve higher reaction rates) tend to have increased unsaturation levels. This sensitivity of unsaturation to increases in epoxide polymerization temperature is preferably minimized or eliminated.

Matsumoto et al. (Jap. Pat. Appl. Kokai No. H6-184297) teach to use an organophosphine oxide as a cocatalyst in a KOH-catalyzed epoxide polymerization to enable increased reaction rates without an increase in polyol unsaturation. The use of the organophosphine oxide is only taught in connection with alkali metal and alkaline earth metal (basic) catalysts; the reference is silent regarding the potential impact of using an organophosphine oxide with a coordination catalyst such as a double metal cyanide catalyst.

An ideal catalyst would give polyether polyols with low unsaturation and would be active enough to use at very low concentrations, preferably at concentrations low enough to overcome any need to remove the catalyst from the polyol. Particularly valuable would be a catalyst that can produce polyether polyols having very low unsaturation levels over a broad range of epoxide polymerization temperatures.

SUMMARY OF THE INVENTION

The invention is a double metal cyanide (DMC) catalyst useful for epoxide polymerizations. The catalyst comprises a DMC compound, an organic complexing agent, an organophosphine oxide, and optionally, a polyether. The catalyst contains from about 0.1 to about 10 wt. % of the organophosphine oxide. When a polyether is included, the catalyst contains from about 5 to about 80 wt. % of the polyether. The invention also includes a method for making the catalysts, and processes for making epoxide polymers.

I surprisingly found that DMC catalysts that include an organophosphine oxide have improved activities compared with similar catalysts made in the absence of the organophosphine oxide. In addition, the catalysts of the invention give polyols having very low unsaturations even at relatively high epoxide polymerization temperatures. The reduced sensitivity of unsaturation to reaction temperature allows for efficient production of polyether polyols while maintaining high product quality.

DETAILED DESCRIPTION OF THE INVENTION

Catalysts of the invention comprise a double metal cyanide (DMC) compound, an organic complexing agent, an organophosphine oxide, and optionally, a polyether.

Double metal cyanide compounds useful in the invention are the reaction products of a water-soluble metal salt and a water-soluble metal cyanide salt. The water-soluble metal salt preferably has the general formula $M(X)_n$ in which M is selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III). More preferably, M is selected from the group consisting of Zn(II), Fe(II), Co(II), and Ni(II). In the formula, X is preferably an anion selected from the group consisting of halide, hydroxide, sulfate, carbonate, cyanide, oxalate, thiocyanate, isocyanate, isothiocyanate, carboxylate, and nitrate. The value of n is from 1 to 3 and satisfies the valency state of M. Examples of suitable metal salts include, but are not limited to, zinc chloride, zinc bromide, zinc acetate, zinc acetonylacetate, zinc benzoate, zinc nitrate, iron(II) sulfate, iron(II) bromide, cobalt(II) chloride, cobalt(II) thiocyanate, nickel(II) formate, nickel (II) nitrate, and the like, and mixtures thereof.

The water-soluble metal cyanide salts used to make the double metal cyanide compounds useful in the invention preferably have the general formula $(Y)_a M'(CN)_b (A)_c$ in which M' is selected from the group consisting of Fe(II), Fe(III), Co(II), Co(III), Cr(II), Cr(III), Mn(II), Mn(III), Ir(III), Ni(II), Rh(III), Ru(II), V(IV), and V(V). More preferably, M' is selected from the group consisting of Co(II), Co(III), Fe(II), Fe(III), Cr(III), Ir(III), and Ni(II). The water-soluble metal cyanide salt can contain one or more of these metals. In the formula, Y is an alkali metal ion or alkaline earth metal ion. A is an anion selected from the group consisting of halide, hydroxide, sulfate, carbonate, cyanide, oxalate, thiocyanate, isocyanate, isothiocyanate, carboxylate, and nitrate. Both a and b are integers greater than or equal to 1; the sum of the charges of a, b, and c balances the charge of M'. Suitable water-soluble metal cyanide salts include, but are not limited to, potassium hexacyanocobaltate(III), potassium hexacyanoferrate(II), potassium hexacyanoferrate(III), calcium hexacyanocobaltate(III), lithium hexacyanoiridate(III), and the like.

Examples of double metal cyanide compounds that can be used in the invention include, for example, zinc hexacyanocobaltate(III), zinc hexacyanoferrate(III), zinc hexacyanoferrate(II), nickel(II) hexacyanoferrate(II), cobalt (II) hexacyanocobaltate(III), and the like. Further examples of suitable double metal cyanide compounds are listed in U.S. Pat. No. 5,158,922, the teachings of which are incorporated herein by reference.

The DMC catalysts of the invention include an organic complexing agent. Generally, the complexing agent must be relatively soluble in water. Suitable complexing agents are those commonly known in the art, as taught, for example, in U.S. Pat. No. 5,158,922. The complexing agent is added either during preparation or immediately following precipitation of the catalyst. Usually, an excess amount of the complexing agent is used. Preferred complexing agents are water-soluble heteroatom-containing organic compounds that can complex with the double metal cyanide compound. Suitable complexing agents include, but are not limited to, alcohols, aldehydes, ketones, ethers, esters, amides, ureas, nitriles, sulfides, and mixtures thereof. Preferred complexing agents are water-soluble aliphatic alcohols selected from the group consisting of ethanol, isopropyl alcohol, n-butyl alcohol, isobutyl alcohol, sec-butyl alcohol, and tert-butyl alcohol. Tert-butyl alcohol is most preferred.

A key component of the DMC catalysts of the invention is an organophosphine oxide. Suitable organophosphine oxides have one or more $C_1$–$C_{30}$ aryl, alkyl, or aralkyl groups attached to phosphorus. Preferred organophosphine oxides have the general formula $R_3P=O$ in which R is a $C_1$–$C_{20}$ alkyl group. Suitable organophosphine oxides include, for example, tri-n-methylphosphine oxide, tri-n-butylphosphine oxide, tri-n-octylphosphine oxide, triphenylphosphine oxide, methyldibenzylphosphine oxide, and the like, and mixtures thereof. The organophosphine oxide is present in the catalyst in an amount within the range of about 0.1 to about 10 wt. %; a more preferred range is from about 0.5 to about 5 wt. %.

I surprisingly found that catalysts prepared in the presence of an organophosphine oxide have high activity for polymerizing epoxides, and they can be used to make polyols having very low unsaturations even at relatively high epoxide polymerization temperatures. The examples below demonstrate the advantage of incorporating an organophosphine oxide into the DMC catalyst.

As the results in Tables 1–2 show, incorporating an organophosphine oxide into a DMC catalyst makes the catalyst activate more quickly and polymerize propylene oxide at a faster rate. In addition, polyols made from the catalysts of the invention have reduced unsaturation levels. As Table 3 shows, the benefit is also obtained when the organophosphine oxide is not part of the DMC catalyst, but is simply added to the reaction mixture during the epoxide polymerization.

The DMC catalysts of the invention optionally include from about 5 to about 80 wt. % of a polyether, which is preferably a polyether polyol. Preferably, the catalysts include from about 10 to about 70 wt. %, and more preferably from about 15 to about 60 wt. % of the polyether. At least about 5 wt. % of the polyether is needed to significantly improve the catalyst activity compared with a catalyst made in the absence of the polyether polyol. Catalysts that contain more than about 80 wt. % of the polyether polyol are generally no more active, and they are impractical to isolate and use because they are typically sticky pastes rather than powdery solids.

Suitable polyethers include those produced by ring-opening polymerization of cyclic ethers, and include epoxide polymers, oxetane polymers, tetrahydrofuran polymers, and the like. Any method of catalysis (acid, base, or coordination catalyst) can be used to make the polyethers. The polyethers can have any desired end groups, including, for example, hydroxyl, amine, ester, ether, or the like. Preferred polyethers are polyether polyols having average hydroxyl functionalities from about 2 to about 8 and number average molecular weights within the range of about 200 to about 10,000, more preferably from about 1000 to about 5000. Polyols having at least about 5%, and preferably at least about 20% of tertiary hydroxyl end groups, are particularly preferred. The polyols are usually made by polymerizing epoxides in the presence of active hydrogen-containing initiators and basic, acidic, or organometallic catalysts (including DMC catalysts). Useful polyether polyols include poly(oxypropylene) polyols, EO-capped poly(oxypropylene) polyols, mixed EO-PO polyols, butylene oxide polymers, butylene oxide copolymers with ethylene oxide and/or propylene oxide, polytetramethylene ether glycols, and the like. Most preferred are poly(oxypropylene) polyols and isobutylene oxide-capped poly(oxypropylene) polyols having number average molecular weights within the range of about 200 to about 4000.

The invention includes a method for making the catalysts. The method comprises reacting aqueous solutions of a metal salt and a metal cyanide salt in the presence of an organic complexing agent, an organophosphine oxide, and optionally, a polyether to produce a DMC catalyst that contains from about 0.1 to about 10 wt. % of the organophosphine oxide.

In a typical method, aqueous solutions of a metal salt (such as zinc chloride) and a metal cyanide salt (such as potassium hexacyanocobaltate) are first reacted in the presence of an organophosphine oxide and an organic complexing agent (such as tert-butyl alcohol) using efficient mixing to produce a catalyst slurry. The metal salt is used in excess. The catalyst slurry contains the reaction product of the metal salt and metal cyanide salt, which is the double metal cyanide compound. Also present are excess metal salt, water, organophosphine oxide, and organic complexing agent; each is incorporated to some extent in the catalyst structure.

The organic complexing agent and organophosphine oxide can be included with either or both of the aqueous salt solutions, or they can be added to the catalyst slurry immediately following precipitation of the DMC compound. It is generally preferred to pre-mix the complexing agent and organophosphine oxide with either aqueous solution, or both, before combining the reactants. If the complexing agent is added to the catalyst precipitate instead, then the reaction mixture should be mixed efficiently with a homogenizer or a high-shear stirrer to produce the most active form of the catalyst.

The catalyst slurry produced as described above is optionally combined with a polyether, preferably a polyether polyol. This is preferably done using low-shear mixing to avoid thickening or coagulation of the reaction mixture. The polyether-containing catalyst is then usually isolated from the catalyst slurry by any convenient means, such as filtration, centrifugation, decanting, or the like.

The isolated polyether-containing solid catalyst is preferably washed with an aqueous solution that contains additional organic complexing agent. After the catalyst has been washed, it is usually preferred to dry it under vacuum until the catalyst reaches a constant weight. Suitable techniques for washing and isolating the catalyst are described in U.S.

Pat. No. 5,482,908, the teachings of which are incorporated herein by reference.

The invention includes a process for making an epoxide polymer. This process comprises polymerizing an epoxide in the presence of a double metal cyanide catalyst of the invention. Preferred epoxides are ethylene oxide, propylene oxide, butene oxides, styrene oxide, and the like, and mixtures thereof. The process can be used to make random or block copolymers. The epoxide polymer can be, for example, a polyether polyol derived from the polymerization of an epoxide in the presence of a hydroxyl group-containing initiator.

Other monomers that will copolymerize with an epoxide in the presence of a DMC compound can be included in the process of the invention to make other types of epoxide polymers. Any of the copolymers known in the art made using conventional DMC catalysts can be made with the catalysts of the invention. For example, epoxides copolymerize with oxetanes (as taught in U.S. Pat. Nos. 3,278,457 and 3,404,109) to give polyethers, or with anhydrides (as taught in U.S. Pat. Nos. 5,145,883 and 3,538,043) to give polyester or polyetherester polyols. The preparation of polyether, polyester, and polyetherester polyols using double metal cyanide catalysts is fully described, for example, in U.S. Pat. Nos. 5,223,583, 5,145,883, 4,472,560, 3,941,849, 3,900,518, 3,538,043, 3,404,109, 3,278,458, 3,278,457, and in J. L. Schuchardt and S. D. Harper, *SPI Proceedings, 32nd Annual Polyurethane Tech./Market. Conf.* (1989) 360. The teachings of these U.S. patents related to polyol synthesis using DMC catalysts are incorporated herein by reference in their entirety.

Polyether polyols made with the catalysts of the invention preferably have average hydroxyl functionalities from about 2 to 8, more preferably from about 2 to 6, and most preferably from about 2 to 3. The polyols preferably have number average molecular weights within the range of about 500 to about 50,000. A more preferred range is from about 1,000 to about 12,000; most preferred is the range from about 2,000 to about 8,000.

The following examples merely illustrate the invention. Those skilled in the art will recognize many variations that are within the spirit of the invention and scope of the claims.

EXAMPLE 1

Preparation of a DMC Catalyst Containing Tri-n-octylphosphine Oxide

Zinc chloride (75 g) and tri-n-octylphosphine oxide (0.375 g) are dissolved in a beaker with a mixture of tert-butyl alcohol (50 mL) and distilled water (275 mL) (Solution 1). Solution 2 is prepared by dissolving potassium hexacyanocobaltate (7.5 g) in distilled water (100 mL). Solution 3 contains tert-butyl alcohol (2.0 mL) and distilled water (200 mL).

Solutions 1 and 2 are mixed together in a beaker using a homogenizer at 20% of maximum intensity. The mixing rate is increased to 40% intensity for 10 min. Solution 3 is added to the aqueous zinc hexacyanocobaltate slurry, and the mixture is stirred magnetically for 3 min. Catalyst solids are isolated by centrifugation.

The catalyst solids are reslurried in a mixture of tert-butyl alcohol (130 mL) and distilled water (55 mL) and homogenized for 10 min. at 40% intensity, and are then isolated as described above. The solids are reslurried in tert-butyl alcohol (185 mL) containing dissolved tri-n-octylphosphine oxide (0.375 g), and are homogenized at 40% intensity for 10 min. The solids are isolated by centrifugation, and are dried at 60° C. (30 in. Hg) to constant weight. The yield of dry, powdery catalyst is 7.2 g. By elemental analysis, the catalyst contains 12.6 wt. % Co and 26.2 wt. % Zn.

COMPARATIVE EXAMPLE 2

The procedure of Example 1 is followed, except that tri-n-octylphosphine oxide is omitted. The yield of dry, powdery catalyst is 6.5 g. By elemental analysis, the catalyst contains 13.8 wt. % Co and 30.2 wt. % Zn.

EXAMPLE 3

Preparation of a DMC Catalyst Containing Tri-n-octylphosphine Oxide and a Polyoxypropylene Diol (PPG-425 diol)

Zinc chloride (75 g) and tri-n-octylphosphine oxide (0.375 g) are dissolved in a beaker with a mixture of tert-butyl alcohol (50 mL) and distilled water (275 mL) (Solution 1). Solution 2 is prepared by dissolving potassium hexacyanocobaltate (7.5 g) in distilled water (100 mL). Solution 3 contains tertbutyl alcohol (2.0 mL), PPG-425 diol (400 mol. wt. poly(oxypropylene) diol, 4.0 g) and distilled water (200 mL).

Solutions 1 and 2 are mixed together in a beaker using a homogenizer at 20% of maximum intensity. The mixing rate is increased to 40% intensity for 10 min. Solution 3 is added to the aqueous zinc hexacyanocobaltate slurry, and the mixture is stirred magnetically for 3 min. Catalyst solids are isolated by filtering the mixture through 5.0 micron filter paper at 40 psig.

The catalyst solids are reslurried in a mixture of tert-butyl alcohol (130 mL) and distilled water (55 mL) and homogenized for 10 min. at 40% intensity. Additional PPG-425 diol (1.0 g) is added, and the mixture is magnetically stirred for 3 min. The catalyst solids are then isolated by filtration as described above. The solids are reslurried in tert-butyl alcohol (185 mL) containing dissolved tri-n-octylphosphine oxide (0.375 g), and are homogenized at 40% intensity for 10 min. Additional PPG-425 diol (1.0 g) is added, and the mixture is stirred for 3 min. The solids are isolated by filtration, and are dried at 60° C. (30 in. Hg) to constant weight. The yield of dry, powdery catalyst is 10.3 g.

COMPARATIVE EXAMPLE 4

Preparation of a DMC Catalyst Containing a Polyoxypropylene Diol, but no Tri-n-octylphosphine Oxide The procedure of Example 3 is followed, except that tri-n-octylphosphine oxide is omitted from the formulation. The yield of dry, powdery catalyst is 9.3 g.

EXAMPLE 5

Measurement of Catalyst Activity

Activities of the catalysts of Example 1 and Comparative Example 2 are measured during the preparation of polyether triols (hydroxyl number=30 mg KOH/g) as follows.

A one-liter stirred reactor is charged with 70 g of a 700 mol. wt. poly(oxypropylene) triol starter polyol and zinc hexacyanocobaltate/tert-butyl alcohol catalyst (0.029 g) (50 ppm of catalyst in the final polyol product). The mixture is stirred and heated to 105° C. under vacuum to remove traces of residual water. Propylene oxide (PO) (10 g) is added to the reactor, and the pressure in the reactor is increased from vacuum to about 4 psig. An accelerated drop in reactor pressure soon occurs, indicating that the catalyst has become activated. After initiation of the catalyst is verified, additional propylene oxide (a total of 500 g) is added slowly to the reactor to maintain the reactor pressure at about 10 psig.

Catalyst activity is measured from the slope of a PO conversion vs. time plot at its steepest point, and is reported in terms of kg PO per gram of cobalt per minute (see Table 1). After the PO addition is complete, the reaction mixture is held at 105° C. until a constant pressure is obtained, which indicates that PO conversion is complete. The mixture is vacuum stripped at 60° C. for 0.5 h to remove any traces of unreacted PO from the reactor. The product is cooled and recovered. The product is a poly(oxypropylene) triol having a hydroxyl number of about 30 mg KOH/g.

As the results in Table 1 show, catalyst activity increases from 4.6 to 5.6 kg PO/g Co/min. when tri-n-octylphosphine oxide is incorporated into the catalyst.

EXAMPLE 6

Polyether Polyol Synthesis: Preparation of an 8K Mol. Wt. Polyoxypropylene Diol

The catalysts of Example 3 and Comparative Example 4 are used to make 8000 molecular weight polyoxypropylene diols as described below.

A one-liter stirred reactor is charged with polyoxypropylene diol (1000 mol. wt.) starter (77 g) and zinc hexacyanocobaltate/tert butyl alcohol/PPG-425 diol catalyst (0.015 g, 25 ppm based on the amount of finished polyol product). The mixture is stirred and heated to 105° C., and is stripped under vacuum for 0.5 h to remove traces of water from the diol starter. After stripping, the reaction temperature is raised to 145° C. Propylene oxide (12 g) is fed to the reactor, initially under a vacuum of about 30 in. (Hg), and the reactor pressure is monitored carefully. Additional propylene oxide is not added until an accelerated pressure drop occurs in the reactor; the pressure drop is evidence that the catalyst has become activated. When catalyst activation is verified, the remaining propylene oxide (512 g) is added gradually over about 4 h. After propylene oxide addition is complete, the mixture is held at 145° C. until a constant pressure is observed. Residual unreacted monomer is then stripped under vacuum at 60° C. from the polyol product. The warm polyol product is filtered through a filter cartridge (0.45 to 1.2 microns) attached to the bottom of the reactor to remove the catalyst. Polyol unsaturations are compared in Table 2.

The results in Table 2 show that an 8K mol. wt. diol prepared with a DMC catalyst that incorporates an organophosphine oxide has reduced unsaturation compared with a diol made with a catalyst that does not contain the organophosphine oxide. Unsaturation drops from 0.0154 to 0.0108 meq/g.

EXAMPLES 7-8 and COMPARATIVE EXAMPLE 9

Effect of Adding the Organophosphine Oxide to the Reaction Mixture in the Preparation of an 8K Mol. Wt. Polyoxypropylene Diol The procedure of Example 6 is generally followed to make an 8000 molecular weight polyoxypropylene diol with the zinc hexacyanocobaltate/tert-butyl alcohol catalyst of Comparative Example 2. In Examples 7 and 8, tri-n-octylphosphine oxide (25 ppm or 100 ppm) is added to the polymerization mixture. In Comparative Example 9, the organophosphine oxide is omitted. Table 3 summarizes the polyol unsaturation results.

As Table 3 shows, the unsaturation of polyether polyols made using DMC catalysts can be reduced simply by adding a small amount of an organophosphine oxide to the reaction mixture. Addition of 25 ppm of tri-n-octylphosphine oxide reduces unsaturation of an 8000 molecular weight polyoxypropylene diol from 0.009 to 0.007 meq/g.

The preceding examples are meant only as illustrations. The scope of the invention is defined by the claims.

TABLE 1

Effect of Organophosphine Oxide on Activity of DMC Catalysts

| Catalyst of Ex # | Catalyst | Level (ppm) | Temp. (°C.) | Activation time (min) | Activity (kg PO/g Co/min) |
|---|---|---|---|---|---|
| 1 | Zn—Co/TBA/ TOPO | 50 | 105 | 162 | 5.6 |
| C2 | Zn—Co/TBA | 50 | 105 | 220 | 4.6 |

Zn—Co/TBA = zinc hexacyanocobaltate/tert-butyl alcohol complex; TOPO = tri-n-octylphosphine oxide
Catalyst level is based on the amount of polyol product made.
C = comparative example

TABLE 2

Effect of Organophosphine Oxide on Polyol Unsaturation

| Catalyst of Ex # | Catalyst | Level (ppm) | Temp. (°C.) | 8K Diol Unsaturation (meq/g) |
|---|---|---|---|---|
| 3 | Zn—Co/TBA/ PPG-425/ TOPO | 25 | 145 | 0.0108 |
| C4 | Zn—Co/TBA/ PPG-425 | 25 | 145 | 0.0154 |

Zn—Co/TBA = zinc hexacyanocobaltate/tert-butyl alcohol complex; TOPO = tri-n-octylphosphine oxide
Catalyst level is based on the amount of polyol product made.
C = comparative example

TABLE 3

Effect of Adding Organophosphine Oxide during Polymerization on Polyol Unsaturation

| Ex # | Catalyst | TOPO added (ppm) | Temp. (°C.) | 8K Diol Unsaturation (meq/g) |
|---|---|---|---|---|
| 7 | Zn—Co/TBA | 25 | 145 | 0.0070 |
| 8 | Zn—Co/TBA | 100 | 145 | 0.0072 |
| C9 | Zn—Co/TBA | 0 | 145 | 0.0090 |

Zn—Co/TBA = zinc hexacyanocobaltate/tert-butyl alcohol complex (prepared as in Comparative Example 2).
TOPO = tri-n-octylphosphine oxide
C = comparative example

I claim:

1. A catalyst which comprises:

(a) a double metal cyanide (DMC) compound;

(b) an organic complexing agent; and (c) from about 0.1 to about 10 wt. % of an organophosphine oxide having the general formula $R_3P\!=\!O$ in which R is selected from the group consisting of hydrogen and one or more $C_1$–$C_{30}$ alkyl, aryl, or aralkyl groups; and (d) optionally, from about 5 to about 80 wt. % of a polyether.

2. The catalyst of claim 1 wherein the double metal cyanide compound is a zinc hexacyanocobaltate.

3. The catalyst of claim 1 wherein the organic complexing agent is tert-butyl alcohol.

4. The catalyst of claim 1 wherein the polyether is present and is a polyether polyol selected from the group consisting of poly(oxypropylene) polyols and isobutylene oxide-capped poly(oxypropylene) polyols.

5. The catalyst of claim 1 wherein the organophosphine oxide is tri-n-octylphosphine oxide.

6. A method which comprises reacting aqueous solutions of a metal salt and a metal cyanide salt in the presence of an organic complexing agent, an organophosphine oxide having the general formula $R_3P\!=\!O$ in which R is selected from the group consisting of hydrogen and one or more $C_1$–$C_{30}$ alkyl, aryl, or aralkyl groups, and, optionally, a polyether to produce a double metal cyanide (DMC) catalyst that contains from about 0.1 to about 10 wt. % of the organophosphine oxide.

7. The method of claim 6 wherein the DMC catalyst is a zinc hexacyanocobaltate.

8. The method of claim 6 wherein the organic complexing agent is tert-butyl alcohol.

9. The method of claim 6 wherein the polyether is present and is a polyether polyol selected from the group consisting of poly(oxypropylene) polyols and isobutylene oxide-capped poly(oxypropylene) polyols.

10. The catalyst of claim 6 wherein the organophosphine oxide is tri-n-octylphosphine oxide.

* * * * *